US011609901B2

(12) United States Patent
Wong et al.

(10) Patent No.: US 11,609,901 B2
(45) Date of Patent: Mar. 21, 2023

(54) AUTOMATIC DERIVATION OF SHARD KEY VALUES AND TRANSPARENT MULTI-SHARD TRANSACTION AND QUERY SUPPORT

(71) Applicant: Oracle International Corporation, Redwood Shores, CA (US)

(72) Inventors: Lik Wong, Palo Alto, CA (US); Leonid Novak, Castro Valley, CA (US); Douglas N. Surber, Orinda, CA (US); Ilesh Garish, Pleasanton, CA (US); Saurabh Verma, Bangalore (IN); Wei Ming Hu, Palo Alto, CA (US); Mark Dilman, Sunnyvale, CA (US); Jean de Lavarene, Versailles (FR)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/473,525

(22) Filed: Sep. 13, 2021

(65) Prior Publication Data
US 2021/0406252 A1 Dec. 30, 2021

Related U.S. Application Data

(63) Continuation of application No. 16/565,273, filed on Sep. 9, 2019, now Pat. No. 11,151,124.

(51) Int. Cl.
*G06F 16/23* (2019.01)
*G06F 16/2455* (2019.01)

(52) U.S. Cl.
CPC .... *G06F 16/2379* (2019.01); *G06F 16/24553* (2019.01)

(58) Field of Classification Search
None
See application file for complete search history.

(56) References Cited

U.S. PATENT DOCUMENTS

| 6,985,904 B1 | 1/2006 | Kaluskar |
| 2015/0317340 A1* | 11/2015 | Sardina ................ G06F 12/08 707/803 |
| 2016/0306832 A1 | 10/2016 | Hegde |
| 2017/0103092 A1 | 4/2017 | Hu et al. |
| 2019/0384846 A1 | 12/2019 | Mathur |

(Continued)

FOREIGN PATENT DOCUMENTS

WO  WO 2017/062288 A1  4/2017

OTHER PUBLICATIONS

Turcu, Alexandru, et al., "Hyflow2: A High Performance Distributed Transactional Memory Framework in Scala", ACM PPPJ '13, pp. 79-88. (Year: 2013).*

(Continued)

*Primary Examiner* — Scott A. Waldron
(74) *Attorney, Agent, or Firm* — Hickman Becker Bingham Ledesma LLP (57) ABSTRACT

Techniques are provided for processing a database command in a sharded database. The processing of the database command may include generating or otherwise accessing a shard key expression, and evaluating the shard key expression to identify one or more target shards that contain data used to execute the database command.

20 Claims, 6 Drawing Sheets

(56) References Cited

U.S. PATENT DOCUMENTS

2021/0073208 A1  3/2021  Wong et al.

OTHER PUBLICATIONS

Bacon, David, et al., "Spanner: Becoming a SQL System", ACM SIGMOD '17, pp. 331-343. (Year: 2017).*

Wong, U.S. Appl. No. 16/565,273, filed Sep. 9, 2019, Office Action, dated Apr. 28, 2021.

Wong, U.S. Appl. No. 16/565,273, filed Sep. 9, 2019, Notice of Allowance, dated Jun. 16, 2021.

Wong, U.S. Appl. No. 16/565,273, filed Sep. 9, 2019, Interview Summary, dated Jun. 11, 2021.

* cited by examiner

AUTOMATIC DERIVATION OF SHARD KEY VALUES AND TRANSPARENT MULTI-SHARD TRANSACTION AND QUERY SUPPORT

CROSS-REFERENCE TO RELATED APPLICATIONS; BENEFIT CLAIM

This application is a continuation of U.S. patent application Ser. No. 16/565,273, entitled AUTOMATIC DERIVATION OF SHARD KEY VALUES AND TRANSPARENT MULTI-SHARD TRANSACTION AND QUERY SUPPORT, filed by Lik Wong, et al. on Sep. 9, 2019, the entire contents of which are incorporated herein by reference.

TECHNICAL FIELD

The present disclosure relates to database systems. More specifically, the disclosure relates to processing database commands in a sharded database system.

BACKGROUND

Database systems that store increasingly large amounts of data are becoming more and more prevalent. For example, online transaction processing (OLTP) systems, such as e-commerce, mobile, social, and Software-as-a-Service (SaaS) systems, typically require large database storage. Example applications for OLTP systems include, but are not limited to, large billing systems, ticketing systems, online financial services, media companies, online information services, and social media companies. Given the significant amount of data stored by these database systems, storing all the data on a single database instance may be impractical, as the amount of data can utilize significant computing resources, such as processors, memory, and storage.

Horizontal partitioning is a technique of decomposing a single larger table into smaller, more manageable subsets of information, called "partitions." Sharding is a data tier architecture where data is horizontally partitioned across independent database instances, and where each independent database instance is referred to as a "shard." A collection of shards, together, makes up a single logical database which is referred to as a "sharded database" ("SDB"). Logically, a sharded database can be accessible to a client application just like a traditional unsharded database. However, tables in a sharded database are horizontally partitioned across shards.

A client application may need to be specifically designed or modified (be "shard aware") in order to access and execute database commands, such as queries and data manipulation commands, on a sharded database system. In an example, a client application generates database commands that include or otherwise specify a shard key value, which is used to identify a particular shard for executing the database command.

In cases where client applications are not shard aware, a shard director may be included in an SDB system and configured to process database commands and direct or forward commands to target shards. However, constant use of a shard director in this manner can reduce scalability of the overall sharded database system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present disclosure are illustrated by way of example, and not in way by limitation, in the figures of the accompanying drawings and in which like reference numerals refer to similar elements and in which.

DESCRIPTION OF THE EXAMPLE EMBODIMENT(S)

In the following description, for the purposes of explanation, numerous specific details are set forth in order to provide a thorough understanding of the example embodiment(s) of the present disclosure. It will be apparent, however, that the example embodiment(s) may be practiced without these specific details. In other instances, well-known structures and devices are shown in block diagram form in order to avoid unnecessarily obscuring the example embodiment(s).

General Overview

Techniques are described herein for processing database commands that are executed in a sharded database or SDB system in a manner that avoids the issue of specifically designing a client application to be shard aware and providing a shard key along with a requested database command, for instance. Such SDB command processing techniques include automatic derivation of shard key values for database commands, which may include structured query language (SQL) queries and data manipulation language (DML) commands. In an embodiment, the derivation of shard key values is transparent to the client applications that issue the database commands to the sharded database system. In addition, the derivation of shard key values is performed using shard key expressions that correspond to the database commands.

The techniques described herein also support derivation of a shard key expression and corresponding shard key value from rich or complex SQL commands that may include joins, subqueries, and expressions with operators. Accordingly, the client application need not be specially designed to operate in an SDB system in order to issue database queries and database commands to a sharded database system. For instance, the given database command does not need to specify a shard key value or service name of a table family for direct routing to a target shard, nor does the client application need to otherwise explicitly provide the shard key/service name to an SDB system. As a result, the SDB command processing techniques disclosed herein help to eliminate or minimize application changes that hinder the adoption of sharded databases. Further, by providing automatic and transparent derivation of shard key values for database commands, a client-side driver supports direct command routing to a shard.

The SDB command processing techniques also transparently support multi-shard queries and multi-shard transactions or updates with ACID (atomicity, consistency, isolation, and durability) properties without requiring application code changes. The command processing techniques distinguish between single-shard and multi-shard commands transparently from the perspective of an application, which is thus not required to be specially programmed or configured to distinguish between single-shard and multi-shard commands. In an embodiment, the SDB command processing techniques distinguish and separate single-shard commands from multi-shard commands, which allows for the use of a database coordinator only as needed or desired, for instance to process just multi-shard commands. Further, the SDB command processing techniques may distinguish between single-shard and multi-shard transactions or updates to promote such commands to a protocol that can support coordination of distributed transactions involving multiple data sources. Such multi-shard transaction protocols include XA, Java Transaction API (JTA), among others.

Sharded Databases

Horizontal partitioning is a technique of decomposing a single larger table into smaller, more manageable subsets of information, called "partitions". Sharding is a data tier architecture where data are horizontally partitioned across independent database instances, where each independent database instance is referred to as a "shard." A collection of shards, together, makes up a single logical database which is referred to as a "sharded database" or "SDB." Logically, a sharded database can be accessible to a client application just like a traditional unsharded database. However, tables in a sharded database are horizontally partitioned across shards.

Figure 1:
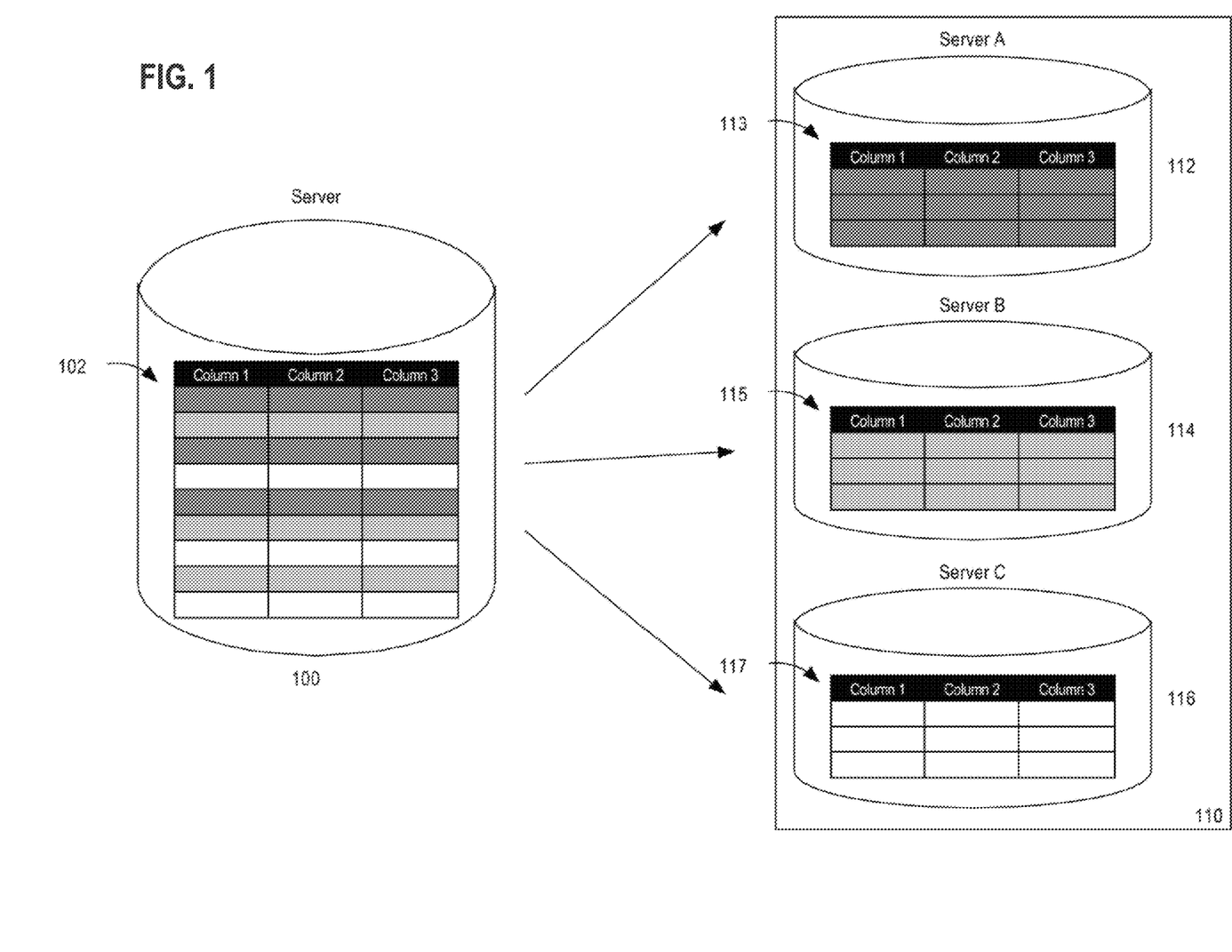
FIG. 1 illustrates examples of an unsharded database and a sharded database, according to one embodiment.

FIG. 1 illustrates an example of an unsharded database 100 and a sharded database 110. Unsharded database 100 is a relational database and includes table 102. All of the contents of table 102 are stored in the same unsharded database 100, and thus likely use the same computing resources, such as processors, memory, and disk space.

Sharded database 110, however, depicts an alternative configuration using sharding techniques. Sharded database 110, includes three shards 112, 114, and 116. Each of the shards 112, 114, and 116 is its own distinct database instance and includes its own distinct tables 113, 115, and 117, respectively. However, in sharded database 110, table 102 has been horizontally partitioned across shards 112, 114, and 116 into tables 113, 115, and 117, respectively. Horizontal partitioning in a sharded database involves splitting a database table, such as table 102, across shards so that each shard contains a subset of rows of table 102. In this example, tables 113, 115, and 117 each contain a subset of rows of table 102. The different sharding of the rows between the table 102 and the tables 113, 115, and 117 illustrate an example of how data can be arranged and split between the unsharded database 100 and the sharded database 110. Collectively, tables 113, 115, and 117 can be referred to as a "sharded table." The data collectively stored in tables 113, 115, and 117 are equivalent to the data stored in table 102. Sharded database 110 is logically treated as a single database, and thus can be accessible by client applications just like unsharded database 100.

In one embodiment, sharding is a shared-nothing database architecture, since shards 112, 114, and 116 do not need to share physical resources like processors, memory, and/or disk storage devices. Shards 112, 114, and 116 are loosely coupled in terms of software and do not need to run clusterware. From the perspective of a database administrator, sharded database 110 consists of multiple database instances that can be managed either collectively or individually. However, from the perspective of a client application, sharded database 110 looks logically like a single database. Therefore, the number of shards included in sharded database 110 and the distribution of data across those shards is completely transparent to client applications.

The configuration of a sharded database 110 provides various benefits. For example, in an embodiment, sharded database 110 improves scalability by eliminating performance bottlenecks and making it possible to increase performance and capacity of the system by adding additional shards and distributing load across shards. Sharded database 110 can be implemented as a share-nothing architecture, therefore, each of the shards in the sharded database is its own database instance and the shards do not need to share hardware, such as processor, memory, and/or disk storage.

In an embodiment, sharded database 110 provides fault containment, as it eliminates single points of failure, such as a shared disk, shared storage area network, clusterware, shared hardware, etc. Instead, sharding provides strong fault isolation, as a failure of a single shard does not affect availability of other shards.

Sharded database 110 may also help to provide enhancements to global data distribution. Sharding makes it possible to store particular data physically close to its customers. Storing data physically close to customers may be necessary to satisfy regulatory requirements when data has to be located, by law, in a certain jurisdiction, by physically locating the shard for that particular data in that jurisdiction. Storing data physically close to customers may also provide performance benefits by improving latency between customer and the underlying data stored in the shards.

Sharded database 110 may also help to allow for rolling upgrades of a system. In a sharded data architecture, changes made to one shard do not affect the contents of other shards in a sharded database, thereby allowing database administrators to first attempt changes on a small subset of data stored in a single shard before rolling those changes out to the rest of the shards in the sharded database.

Sharded database 110 may also help to provide simplicity in cloud deployments. Given the size of a shard can be made arbitrarily small, it is easy for a database administrator to deploy a sharded database in a cloud that consists of a low-end commodity server with local storage.

Generally, sharded database 110 may be most effective in applications that are well-partitioned, primarily access data within a single shard, and do not have strict performance and consistency requirements for cross-shard operations. Thus, sharding is particularly well-suited for OLTP systems, such as e-commerce, mobile, social, and SaaS.

Sharded database 110 may also help to provide improvements to the automatic propagation of database schema changes across shards. Instead of requiring a database administrator to manually apply database schema changes to each individual shard, sharded database 110 can automatically propagate such schema changes to shards from a single entry point.

Sharded database 110 may also help to support traditional structured query language (SQL), and therefore can take advantage of all the full SQL syntax and keywords that are already available. Furthermore, given that sharded database 110 supports SQL, it can be readily integrated with existing client applications that are configured to access a relational database via SQL.

Sharded database 110 may also help to provide the full-featured benefits of a relational database, including schema control, atomicity, consistency, isolation, and durability.

Sharded database 110 may also help to provide direct routing of queries to shards, without requiring an intermediate component to route the query. This direct routing improves system latency by reducing the number of network hops necessary for processing the query.

General System Architecture

Figure 2:
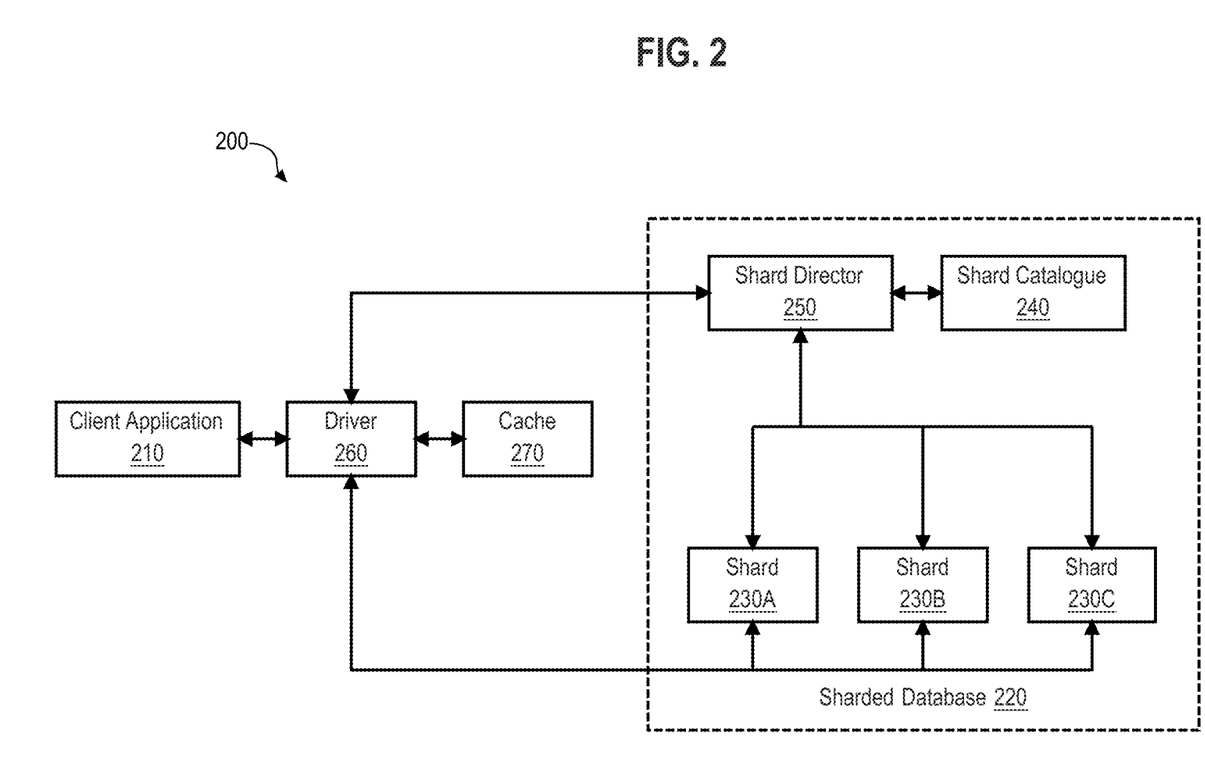
FIG. 2 is a block diagram of a system for sharded database, according to one embodiment.

FIG. 2 is a block diagram of a database system 200 according to one embodiment. Client application 210 is any sort of client application that requires access to data stored in a database. In one embodiment, client application 210 may be a client in an OLTP setting, such as e-commerce, mobile, social, or SaaS. Client application 210 is communicatively coupled to sharded database 220.

Sharded database 220 is a logical database where data are horizontally partitioned across independent database instances. Specifically, data stored in sharded database 220 are horizontally partitioned and stored in shards 230A, 230B, and 230C. A sharded database may include any number of shards, and the number of shards in a sharded database may vary over time. According to one embodiment, each of shards 230A, 230B, and 230C is its own database instance that does not need to share physical resources, such as processors, memory, and/or storage device, with other shards in the sharded database 220.

Shard Catalogue

Sharded database 220 includes a shard catalogue 240. Shard catalogue 240 is a special database that is used to store configuration data for the sharded database 220. In one embodiment, the shard catalogue 240 can be replicated to provide improved availability and scalability. Configuration data that is stored in the shard catalogue 240 may include: a routing table that maps which shard 230 stores a chunk of data that corresponds to a given value, range of values, or set of values of a shard key; shard topology data that describes the overall configuration of the sharded database 220; information about the configuration of the shards 230A, 230B, and 230C; information about the configurations of a shard director 250, driver 260, and/or cache 270; information about the client application 210; information about the schema of the data that is horizontally partitioned across shards 230A, 230B, and 230C; historical logs of pending and completed schema modification instructions for the shards 230A, 230B, and 230C; and all other information related to the configuration of the sharded database 220.

A shard key is a list of column values to horizontally partition a set of tables in a given table family. The shard key may be composite/hierarchical, such as specifying a shard key and a super shard key. One shard key may consist of multiple columns. Each column value of a shard key can be a literal value or a bind variable, and may contain other related information, such as operators and operands. In an embodiment, shard catalogue 240 provides shard key information to help identify and connect to a particular shard, and such shard key information may include a service name for a table family, bind parameters (literal values or variables) of a shard key, bind parameters (literal values or variables) of a super shard key, a type of the shard key, a type of the super shard key, operator functions and operands involved in deriving a shard key value, and/or operator function and operands involved in deriving a super shard key value.

In one embodiment, a shard catalogue 240 maintains a routing table that stores mapping data that includes a plurality of map entries. Each map entry in the plurality of map entries maps a distinct key value set of one or more shard keys to a shard of a plurality of shards in a sharded database. In another embodiment, each map entry in the plurality of map entries maps a distinct key value set of one or more shard keys to a chunk of data on a shard of the plurality of shards in a sharded database. In another embodiment, each map entry in the plurality of map entries maps a distinct key value set of one or more shard keys to a shardspace that includes one or more shards in a sharded database. In an embodiment, a key value set can be a range of partition key values. In another embodiment, a key value set can be a list of partition key values. In another embodiment, a key value set can be set of hash values.

Thus, the routing table can be used to look-up, for a database command that requires access to data for particular shard key value, which shard in the sharded database contains the chunk of data necessary to process the query.

Shard Director

Sharded database 220 includes a shard director 250. Shard director 250 coordinates various functionalities across the sharded database 220, and accordingly may also be referred to as a shard coordinator. The shard director 250 coordinates functions including, but not limited to, routing database requests to shards, parsing database commands to generate shard key expressions, propagating database schema changes to shards, monitoring the status of shards, receiving status updates from shards, receiving notifications from client applications, sending notifications to shards, sending notifications to client applications, and/or coordinating various operations that affect the configuration of the sharded database 220, such as resharding operations. Shard director 250 is communicatively coupled to shard catalogue 240, client application 210, and shards 230A, 230B, and 230C.

In an embodiment, shard director 250 generates or derives shard key expressions from the database commands, such as SQL queries, received from driver 260. Shard director 250 derives a shard key expression for a particular command by parsing the command using data, such as table metadata, shard topology data, and synonyms in one or more database command languages, from shard catalogue 240. Shard director 250 may also derive and send a service name to driver 260 when needed or desired to help differentiate between table families that might have the same shard key expression and/or shard key value. In an embodiment, shard director 250 sends the extracted shard key expression, together with or separately from a service name, to driver 260 as a byte stream in a suitable format, such as a version of Reverse Polish Notation (RPN) that supports different table families, multiple columns in a shard key, multiple level of shard keys (e.g., shard key, super shard key), and SQL expressions with operators. Another suitable format includes higher-level representations, such as JavaScript Object Notation (JSON).

Although depicted as a single shard director 250, in one embodiment, sharded database 220 may include multiple shard directors 250. For example, in one embodiment, sharded database 220 may include three shard directors 250. Having multiple shard directors 250 may allow for load balancing of the coordination tasks performed by the shard directors 250, thereby improving performance. In the case of multiple shard directors 250, in one embodiment, one of the shard directors 250 may be selected as the manager of the shard directors 250 that is responsible for managing the remaining shard directors 250, including load balancing.

Driver and Cache

The database system 200 of FIG. 2 includes driver 260 that is communicatively coupled to client application 210 and to sharded database 220. Driver 260 maintains storage or cache 270 to store entries that associate a given database command with a shard key expression. In an embodiment, multiple specific database commands may be associated with a single shard key expression. Driver 260 and/or shard director 250 may convert a specific database command, which may include literals, bind variables, and/or operators, into a transformed version or prepared statement. In an embodiment, the transformed version or prepared statement is a generalized representation of the database command, and may include one or more bind variables in place of one or more literal values from the original database command. The driver 260 may represent many different database commands by using transformed versions or prepared statements, and associate many different database commands with a lesser number of shard key expressions.

A given shard key expression may also include literals, bind variables, and/or operators. In an embodiment, a shard key expression with bind variables can be used to identify multiple different shards or table families once one or more particular bind values are applied. Generally, a table family is a representation of a hierarchy of related tables, and each table in turn maps which shard stores a chunk of data that corresponds to a given shard value. Since many client applications use database commands, e.g., SQLs, with bind variables for performance, supporting bind variables and operators in the shard key expression and the cache can help to minimize the number of database commands in the cache and reduces the need to retrieve shard key expressions from the shard director.

When driver 260 receives a database command from client application 210, driver 260 determines if there is any database command entry in cache 270 that corresponds to the received database command. If so, driver 260 retrieves an associated shard key expression from cache 270, and may then evaluate the shard key expression to derive a shard key value based on actual bind values. In an embodiment, driver 260 evaluates the shard key expression to obtain a fully evaluated shard key value without contacting shard director 250. Driver 260 uses the shard key value to identify a particular shard 230 and may connect to the particular shard for execution of the database command. In an embodiment, driver 260 connects directly to the particular shard using a connection from a connection pool without routing the database command through other components, such as shard director 250. In an embodiment, driver 260 stores in cache 270 a shard connection pool, which maintains database connections so that the connections can be reused when future requests to the database are required. Since many applications use SQLs with bind variables for performance, supporting bind variables and operators in the shard key expression and the cache 270 greatly minimizes the number of SQLs in the cache and reduces the need to retrieve shard key expression from the shard director.

Driver 260 is also communicatively coupled to sharded database 220 via shard director 250. In an embodiment, if driver 260 determines that a received database command does not correspond to an entry in cache 270, driver 260 communicates the database command to shard director 250 to derive a shard key expression from the database command and return the shard key expression to the driver.

In another embodiment, driver 260 is configured to generate shard key expressions by parsing database commands. To do so, driver 260 is configured to access data from shard catalogue 240, which may also be stored locally to the driver, such as cache 270. Further, driver 260 would be configured to perform complex database command parsing at different database command language versions to help support backward compatibility.

Routing Database Commands

Many queries in a typical client application are short and should be processed with millisecond latency. An extra network hop and parsing during routing of a query to an appropriate shard may introduce latency unacceptable for a client application. The present disclosure provides techniques for minimizing latency when routing queries sent from a client application.

Client application 210 generates and sends database commands to make data requests of sharded database 220. In some instances, a database command from client application 210 will require data from a single shard. Such data requests are called single-shard queries. Single shard queries will represent the majority of data requests for a typical client application, as the shards 230A, 230B, and 230C have been configured such that the chunks in each shard contain corresponding partitions of tables from a table family. Therefore, most database commands that rely on data from a table family will likely be serviced by a single shard, as the related data for that table family is collocated on the same shard. Likewise, using duplicated tables for reference tables that are relatively small and/or static helps to improve the likelihood of queries being processed as single-shard queries.

In other instances, a database command from client application 210 will require data from multiple shards. Such commands are called cross-shard commands. Processing a cross-shard command is typically slower than processing a single-shard command, as it may require joining data from multiple shards. Cross-shard commands may be used to generate reports and collect statistics that requires data from multiple shards, for example.

Shard catalogue 240 maintains a routing table that maps a list of chunks hosted by each shard to ranges of hash values associated with each chunk. The routing table, thus, can be used to determine, for a shard key value or shard key value set, which shard contains the chunk that includes the data for the shard key. In an embodiment, the routing table may further include mapping information for a combination of a shard key and a supershard key in the case that the database is sharded via composite sharding. Thus, in the case of a composite sharded database, the routing table can be used to determine, for a given shard key value set, which shard contains the chunk that includes the data for the shard key value set In an embodiment, the routing table maintained by shard catalogue 240 is accessible to shard director 250, which assists in routing queries to appropriate shards. In an embodiment, functionality of a shard director is implemented in the client application 210, such as via driver 260. In another embodiment, functionality of shard director 250 is implemented on one or more of each individual shard 230.

In a further embodiment, functionality of shard director 250 may be implemented as a software component that is external to shard director 250 and shards 230. That software component may be a part of sharded database 220 or may be external to sharded database 220. In an embodiment, the software component may be external to sharded database 220 and client application 210.

In an embodiment, the shard director functionality may be distributed across multiple software components 51 through SN that exist between client application 210 and sharded database 220. Software components 51 through SN may have different accessibility to client application 210 and/or sharded database 220. Such accessibility reflects various communication characteristics, including, but not limited to, physical proximity, bandwidth, availability of computing resources, work load, and other characteristics that would affect the accessibility of the software components 51 through SN.

In an embodiment, software component 51 may be a client-side component of client application 210 and/or driver 260, and may be more easily accessible to client application 210 than software component S2. Likewise, software component S2 may be more easily accessible to client application 210 than software component S3, and so forth. Thus, in this example, software component 51 is considered closest to the client application 210 as it is the most accessible to client application 210 and software component SN is considered furthest from client application 210 as it is least accessible to the client application 210. In an embodiment, when a database command is created at client application 210, the closest available software component to the client application 210 is first used to attempt to process the database request. If the closest available software component to the client application 210 is unable to process the database command, the next closest software component is tried, and so forth, until the database command is successfully processed and directed to shard(s) 230 for execution. For example, a software component may be unable to process the database command if it does not have sufficient mapping data to correctly route the command. By using the closest available software component to client application 210 to process the database command, database system 200 can provide improved performance in processing the command, as the closest available software component has improved accessibility compared to other software components.

Accessing and Generating Shard Key Expressions

In an embodiment, client application 210 generates a database command to be executed on sharded database 220, but that does not include a shard key value. Consequently, client application 210 cannot directly route the command to one or more identified shards 230 for execution or processing.

Figure 3A:
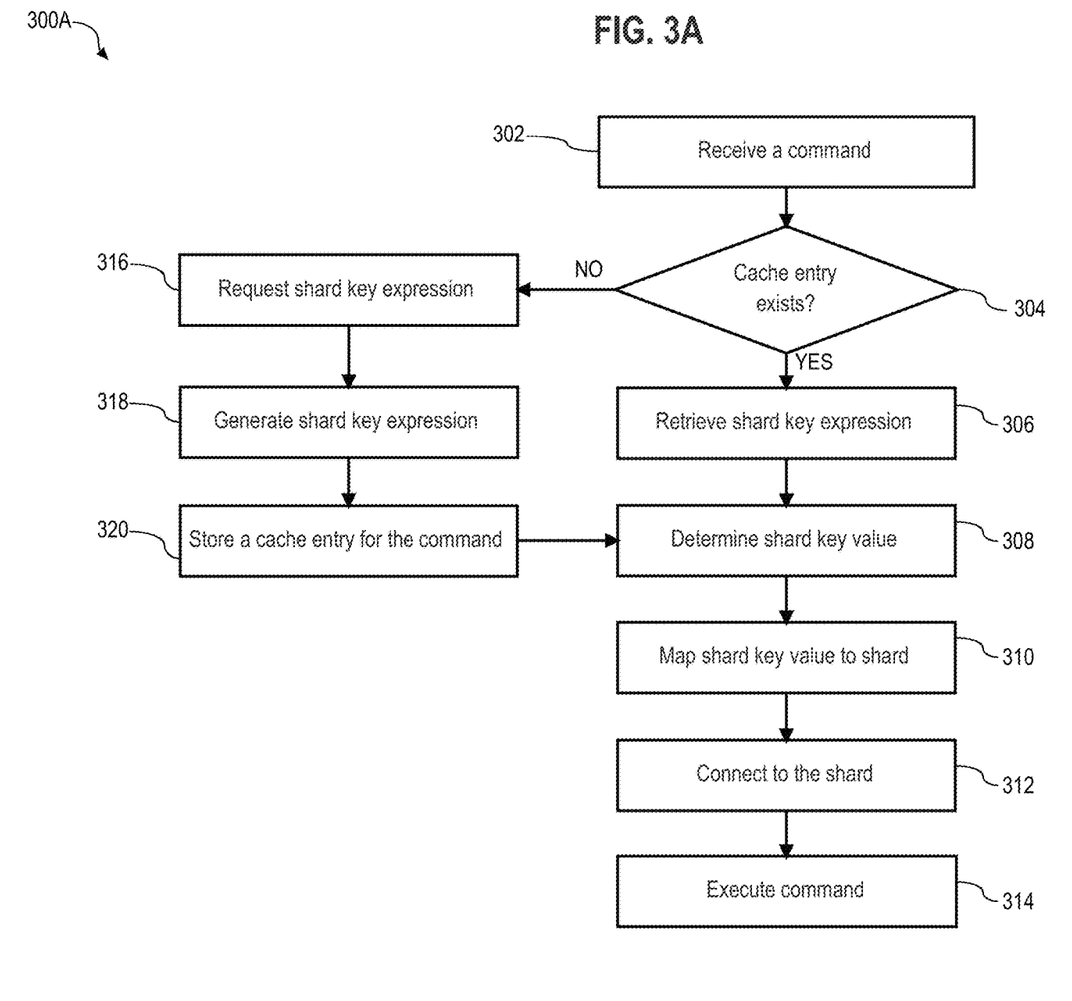
FIG. 3A is a flow diagram for processing a database command according to an embodiment.

FIG. 3A is a flow diagram for a process 300A to access a shard key expression, which can be evaluated to identify a target shard key value. At block 302, driver 260 receives a database command from client application 210. The database command may be a SQL statement or DML command, for instance. At block 304, driver 260 determines whether the received database command corresponds to any database command entry in cache 270 coupled to the driver, and if so, identifies the corresponding database command entry. At block 306, if the received database command does correspond to a database command entry in cache 270, the driver 270 retrieves a shard key expression from the cache that is associated with the identified database command entry. Following block 306, at block 308, driver 270 evaluates the shard key expression to determine a shard key value. Generally, driver 270 evaluates the shard key expression by replacing bind variables with bind values, which may be provided in the original database command, and/or by evaluating operators in the shard key expression. If driver 270 is not able to determine a shard key value from the shard key expression, the driver may invalidate the corresponding database command entry, and provide the database command to shard director 250 for processing.

At block 310, driver 270 uses the shard key value and a routing table to identify a particular target shard 230 that contains data needed to process the database command. At block 312, driver 270 connects directly to the particular shard. At block 314, the database command is communicated to the connected shard for execution and a result may be returned directly to driver 260 and client application 210 as a result of the execution. At block 314, a target shard can also return mapping data that identifies all key ranges the particular shard stores. This mapping data can be stored by driver 260 in cache 270 as a connection pool, for instance. The mapping data allows the driver 260 to directly route subsequent commands that have a shard key expression or value that matches the cached mapping data to the target shard, without needing to consult the shard director 250. This helps to improve performance for subsequent database requests to the target shard.

If driver 260 determines at block 304 that the received database command does not correspond to any database command entry in cache 270, at block 316, driver 260 requests a shard key expression for the database command. In an embodiment, at block 318, driver 260 sends the database command to shard director 250, which at block 318, parses the database command into a tree structure, and traverses through the tree structure using data from shard catalogue 240 to generate the shard key expression. In this embodiment, shard director 250 sends the shard key expression to driver 260, which at block 320, stores a cache entry that associates the shard key expression with the database command. In another embodiment, at block 318, driver 260 parses the database command to generate the shard key expression, and at block 320, driver 260 stores a cache entry that associates the shard key expression with the database command. Following block 320, driver 260 determines a shard key value from the shard key expression (block 308), maps the shard key value to a particular shard (block 310), connects to the particular shard (block 312), and provides the database command to the shard for execution (block 314).

At block 320, driver 260 and/or shard director 250 may store the received database command, including literals, in cache 270. At block 320, alternatively or in addition, driver 260 and/or shard director 250 may transform the received database command into a prepared statement to be stored in cache 270. Generally, a prepared statement is a database command with bind variables in place of literals, for storing in cache 270. Illustratively, original database SQL commands may include: SELECT fname, lname, pcode FROM cust WHERE id=100; SELECT fname, lname, pcode FROM cust WHERE id=200; and SELECT fname, lname, pcode FROM cust WHERE id=300. An example prepared statement that represents these three SQL commands may be: SELECT fname, lname, pcode FROM cust WHERE id=: cust_no.

In an embodiment, if shard director 250 or driver 260 cannot generate a shard key expression for the database command, shard director 250 is configured to parse the database command to generate a shard key value, and may return the shard key value to the driver 260 and/or may route the database command to one or more target shards.

As a result of process 300A, driver cache 270 may over-time accumulate many, if not substantially all, of the most common database commands executed by a given client application. As a result, as database commands are received, driver 260 is able to identify existing database command entries in cache 270, evaluate corresponding shard key expressions to determine shard key values, and use the determined shard key values to connect directly to target shard(s). This helps to eliminate the "middle-man" of the shard director 250, thereby, helps to efficiently process database commands in database system 200.

As discussed herein, shard director 220 and/or driver 260 may use table metadata and sharding topology, for instance, to parse database commands and derive shard key expressions. There are numerous suitable ways to represent a shard key expression, such as in Reverse Polish Notation (RPN) format, or in a custom name value pair structure of JavaScript Object Notation (JSON). In an embodiment, the shard key expression is represented in a shard key wire form as an RPN expression. Using an RPN expression provides a compact storage format that is also highly extensible for any future additional expression supports in database command languages and shard key enhancements, such as multiple hierarchies of shard keys.

An example representation of a shard key expression in RPN format may follow the following abstract grammar:

```
<shard key expression> ::= <token>
<token> ::= <parameter> | <literal> | <operator>
<parameter> ::= ':' <digit> . . .
<literal> ::= <string literal> | <numeric literal> | . . .
<string literal> ::= '"' <char> . . . '"'
<char> ::= <unicode representation>
<numeric literal> ::= <number format>
<op> ::= 'to_date' | 'timestamp' | 'add' | 'sub' | 'mul' | 'div' | 'swap' |
'dup' | 'pop' | 'concatenate' | . . .
```

In this embodiment, a shard key expression may be specified by a token; a token may be specified by a parameter, literal, and/or operator; a parameter may be specified by a column and digit; a literal may be specified by a value from an application and may be a string literal or numeric literal; a string literal may be specified by characters; characters may be specified by a Unicode representation; a numeric literal may be specified by some number format; and operators (<op>) that can be evaluated are also provided.

In an illustrative embodiment, a database command from client application 210 may be: select * from customers where cust_no=:b1 and date1=to_date('APR-04-09', 'MON-DD-YY') and cust_region='California'. In this example, "cust_region" is a super shard key and "cust_no" and "date1" is a composite, or two-part, shard key. The "cust_no" portion of the shard key is specified by a bind variable "b1" that can be evaluated with a specific customer number, such as customer number 100. The "date1" portion of the shard key is specified by an operator "to_date" with operands "APR-04-09" and "MON-DD-YY" used to evaluate the operator.

Upon parsing the database command, a shard key expression in RPN format is provided in a "Wire expression" column of Table 1 (as illustrated above). A service name for the table family in the shard key expression is omitted in this example. Driver 260 uses a memory stack to process the shard key expression and derive the shard key value shown in a "Stack content" column. Driver 260 performs various operations in response to different portions of the shard key expression.

At row 1 of Table 1, driver 260 receives or otherwise processes a shard key expression command "push_empty_tuple", and in response pushes an empty tuple to the stack, such as an empty array list, indicated as { }. At row 2, driver 260 receives a shard key expression command "push_empty_key", and in response pushes an empty key to the stack, such as an empty array list, indicated as [ ]. Generally, a tuple and key are provided to facilitate the shard key value derivation by driver 260.

At row 3, driver 260 receives a command "push_bind_variable 1", and in response identifies a bind variable by position and pushes (bind_variable, 1) to the stack. At row 4, driver 260 receives a command "push_type 2", and in response pushes (type, 2) to the stack. In this example, bind type 2 specifies a number. At row 5, driver 260 receives a command "push_parameter", and in response the driver pops two objects from stack, (type, 2) & (bind_variable, 1). The first bind value is at position 1 of type number, and in this example the bind value is 100. Driver pushes 100 to the stack. At row 6, driver 260 receives a command "append_value_to_key", and in response pops (100) and [ ] from the stack, and pushes array list [(100)] into the stack. At this point, [(100)] is a shard key value.

At row 7, driver 260 receives a command "push_literal_length 9", and in response pushes (literal_length, 9) object to the stack. At row 8, driver 260 receives a command "push_type 1" and pushes (type, 1) object to the stack. In this example, type 1 specifies a character. At row 9, driver 260 receives a command "push_literal APR-04-09", and in response pops (type, 1) and (literal_length, 9), reads 9 bytes from the wire, and pushes 'APR-04-09' as the literal. At row 10, driver 260 receives a command "push_literal_length 9", and in response pushes (literal_length, 9) object to the stack. At row 11, driver 260 receives a command "push_type 1" and in response pushes (type, 1) object to the stack. In this example, type 1 specifies a character. At row 12, driver 260 receives a command "push_literal 'MON-DD-YY'", and in response pops (type, 1) and (literal_length, 9), reads 9 bytes from the wire, and pushes 'MON-DD-YY' as the literal. At row 13, driver 260 receives a command "push_binary_operator TO_DATE", and in response pops ('MON-DD-YY') and ('APR-04-09'), evaluates TO_DATE with these two operands, and pushes the evaluated result, which in this example is 04/04/2009, to the stack. At row 14, driver 260 receives a command "append_value_to_key", and in response pops (04/04/2009) and [(100)] from the stack, and pushes array list [(100)(04/04/2009)] into the stack. At this point, [(100)(04/04/2009)] is a shard key value. At row 15, driver 260 receives a command "append_key_to_tuple", and in response pops [(100)(04/04/2009)] and { }, and pushes the top element into { }. The stack content—[(100)(04/04/2009)]—is a complete shard key value at this point.

At row 16, driver 260 receives a command "push_empty_key", and in response pushes an empty key to the stack, such as an empty array list indicated as [ ]. This is for a super shard key. At row 17, driver 260 receives a command "push_literal_length 10", and in response pushes (literal_length, 10) object to the stack. At row 18, driver 260 receives a command "push_type 1", and in response pushes (type, 1) object to the stack. In this example, type 1 specifies a character. At row 19, driver 260 receives a command "push_literal California", and in response pops (type, 1) and (literal_length, 10), reads 10 bytes from the wire, and pushes ('California') as the literal. At row 20, driver 260 receives a command "append_value_to_key", and in response pops ('California') and [ ] from the stack, and pushes array list [('California')] into the stack. At this point, [('California')] is a super shard key value. At row 21, driver 260 receives a command "append_key_to_to_tuple", and in response pops [('California')] and {[(100)(04/04/2009)]}, and pushes [('California')] into {[(100)(04/04/2009)]}. [('California')] is a complete shard key value. At row 22, driver 260 receives a command "return tuple", and in response pops the top element from the stack. The resulting fully evaluated shard key value is provided as {[(100)(04/04/2009)] [('California')]}.

TABLE 1

| Row | Wire expression | Stack content |
|---|---|---|
| 1 | push_empty_tuple | { } |
| 2 | push_empty_key | { }[ ] |
| 3 | push_bind_variable 1 | { }[ ](bind_variable, 1) |
| 4 | push_type 2 | { }[ ](bind_variable, 1)(type, 2) |
| 5 | push_parameter | { }[ ](100) |
| 6 | append_value_to_key | { }[(100)] |
| 7 | push_literal_length 9 | { }[(100)](literal_length, 9) |
| 8 | push_type 1 | { }[(100)] (literal_length, 9)(type, 1) |
| 9 | push_literal APR-04-09 | { }[(100)]('APR-04-09') |
| 10 | push_literal_length 9 | { }[(100)]('APR-04-09') (literal_length, 9) |
| 11 | push_type 1 | { }[(100)]('APR-04-09') (literal_length, 9)(type, 1) |
| 12 | push_literal 'MON-DD-YY' | { }[(100)] ('APR-04-09'), (MON-DD-YY) |
| 13 | push_binary_operator TO_DATE | { }[(100)] (04/04/2009) |
| 14 | append_value_to_key | { }[(100)(04/04/2009)] |
| 15 | append_key_to_tuple | { [(100)(04/04/2009)] } |
| 16 | push_empty_key | { [(100)(04/04/2009)] }[ ] |
| 17 | push_literal_length 10 | { [(100)(04/04/2009)] } [ ] (literal_length, 10) |
| 18 | push_type 1 | { [(100)(04/04/2009)] } [ ] (literal_length, 10)(type, 1) |
| 19 | push_literal California | { [(100)(04/04/2009)] } [ ] ('California') |
| 20 | append_value_to_key | { [(100)(04/04/2009)] }[('California')] |
| 21 | append_key_to_to_tuple | { [(100)(04/04/2009)] [('California')]} |
| 22 | return tuple | |

Processing Multi-Shard Commands

In an embodiment, client application 210 generates a database command that does not include a shard key value, and that also requires data from multiple shards. Generally, client application 210 requests execution of a mix of single and multi-shard queries. In an embodiment, driver 260 submits multi-shard queries to shard director 250 to coordinate execution of the query across multiple shards. The driver 260 helps to identify multi-shard queries for processing by shard director 250, and such identification and processing is performed transparently from the perspective of client application 210. As a result, client application need not always submit queries to a shard director if there is just a possibility that there are some multi-shard queries, which can be computationally or resource expensive if most of the queries are single shard.

Figure 3B:
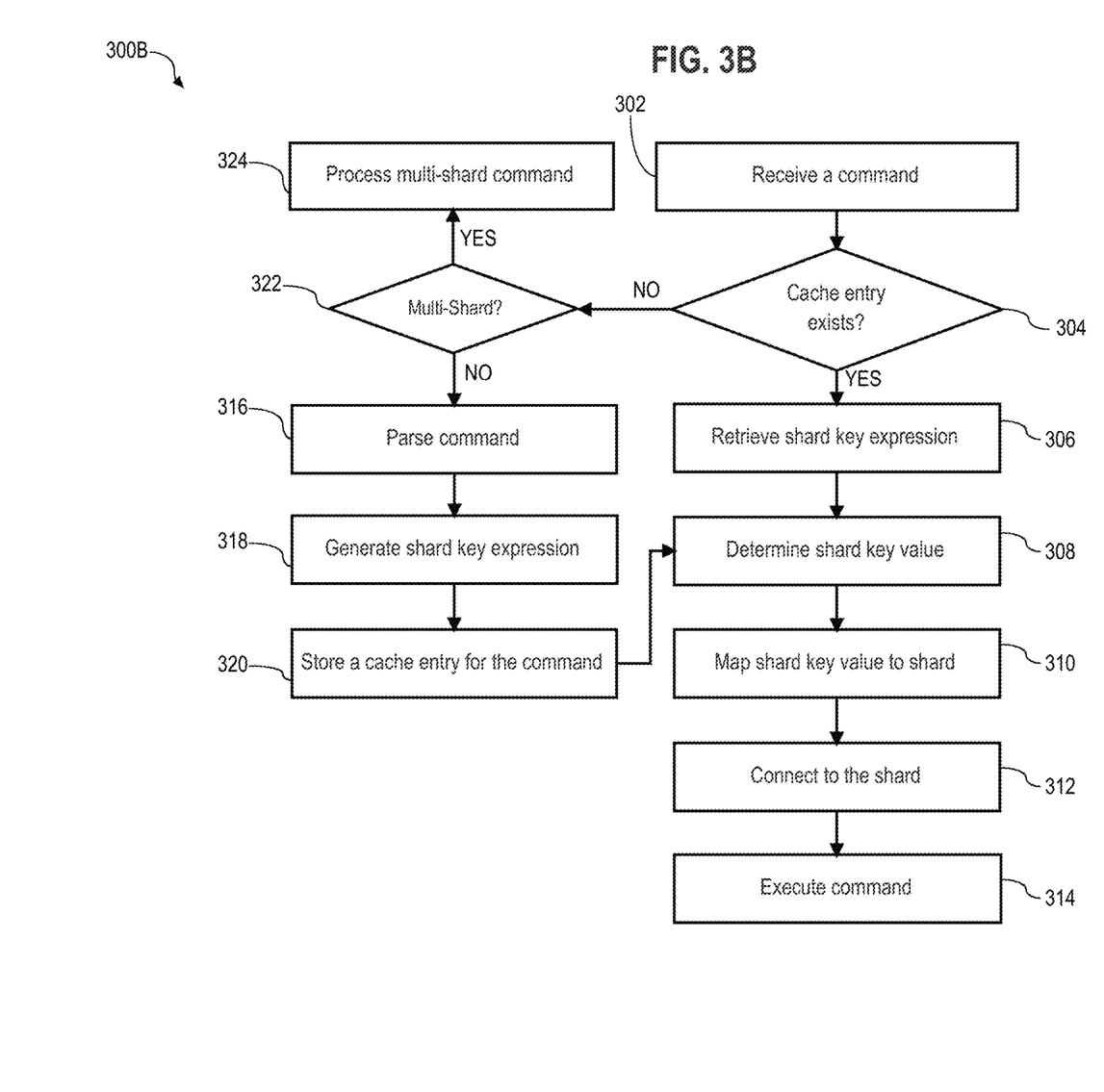
FIG. 3B is another flow diagram for processing a database command according to an embodiment.

FIG. 3B is a flow diagram for a process 300B to manage multi-shard database commands, such as SQL queries. In an embodiment, driver 260 only caches database commands in cache 270 when the driver receives a shard key expression, either from the driver, shard director 250, or some other component. For subsequently received database commands that match an entry in cache 270, driver 260 connects directly to a shard 230 for good performance. In this embodiment, driver 260 continues to connect to shard director 250 for subsequent multi-shard commands. As noted above, this processing is performed transparently from the perspective of client application 210, which does not need to differentiate single-shard commands from multi-shard commands.

The flow diagram 300B includes a block 322, which follows a determination at block 304 that the received database command does not correspond to any database command entry in cache 270. At block 322, driver 260 and/or shard director 250 determine whether the received database command is a multi-shard query. If so, at block 324, shard director 250 receives and handles processing of the multi-shard query. For instance, the shard director may parse the query to identify multiple shard key values for multiple target shards, map the shard key values to the target shards, connect to the shards, communicate the query to the shards for execution, and process results from the shards to generate a result that is communicated back to the driver and client application.

The flow diagram 300B may also be used to support transparent multi-shard transactions, such as DML transactions that may modify data in multiple different shards. Driver 260 helps to handle multi-shard transactions atomically by supporting coordination of globally distributed transactions involving multiple data sources, such as by promoting a multi-shard transaction for processing by an XA protocol or Java Transaction API (JTA), for example. Generally, XA is a two-phase commit protocol that is natively supported by many databases and transaction monitors. XA ensures data integrity by coordinating single transactions accessing multiple relational databases, and guarantees that transactional updates are committed in all of the participating databases, or are fully rolled back out of all of the databases, reverting to the state prior to the start of the transaction.

In other systems, client applications may need to: 1) always use XA if it there might be some multi-shard transactions (which can be expensive if most of the transactions are actually single shard); or 2a) selectively use XA or 2b) go through the shard director 250 and shard catalogue 240 when there are multi-shard updates. The latter approaches (2a, 2b) can be challenging because an application does not always know when it is accessing data across multiple shards. The present disclosure helps by transparently promoting a transaction to XA only when needed.

In an embodiment, at block 322, driver 260 promotes a database transaction to XA (or other suitable protocol) when the driver detects an existing local transaction to a shard 230 or shard director 250, and detects that a second local transaction to a different shard or shard director is requested or initiated. In this example, a connection from a client application to a driver is a logical connection, and a connection from the driver to each database (a shard or the shard director) is a physical connection. For each logical connection, the driver may maintain one or more physical connections to the sharded database. The driver promotes local transactions to XA when there is more than one local transaction with different physical connections. For each database command, the database informs the driver if this command has started a transaction or is in a transaction. When the client application issues commit or rollback, the driver performs the XA protocol to commit or rollback. By default, the database may use tightly coupled transaction branches for the same database. This helps to enable all pre-commit updates made in one transaction branch of a tightly coupled transaction to be visible to other tightly coupled branches in different instances of the database. In an embodiment, to facilitate the seamless promotion of a transaction to XA, shard(s) 230 and shard director 250 may inform driver 260 via piggyback messages if a command would start a transaction in sharded database 220.

In an embodiment, at block 324, driver 260 sends multi-shard transactions to shard director 250, which helps to manage intrinsic performance overhead in the coordination of multiple transaction branches in a distributed transaction, non-trivial recoverability issues, and cascading failures due to in-doubt transactions.

Syntax

Although this disclosure provides various examples of syntax for how to create, manage, and manipulate a sharded database, these examples are merely illustrative. The present system can be implemented using existing relational database coding languages or query languages, such as structured query language (SQL). This means that legacy systems can be easily upgraded, migrated, or connected to a system that includes the sharded database teaching described herein, as there will not require significant changes to SQL. Data manipulation language (DML) usage does not require any changes to utilize the benefits of the present system. Furthermore, DDL usage only requires minor changes to support keywords necessary to implement the sharding organization of the sharded database. Further, the features disclosed herein may be applied to numerous different sharding options, such as Oracle Real Application Clusters (RAC) sharding, shared disk sharding, consolidated database or container database sharding, shared-nothing databases, etc.

Database Overview

Embodiments of the present disclosure are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. DML instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement aspects of the present disclosure are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

Figure 4:
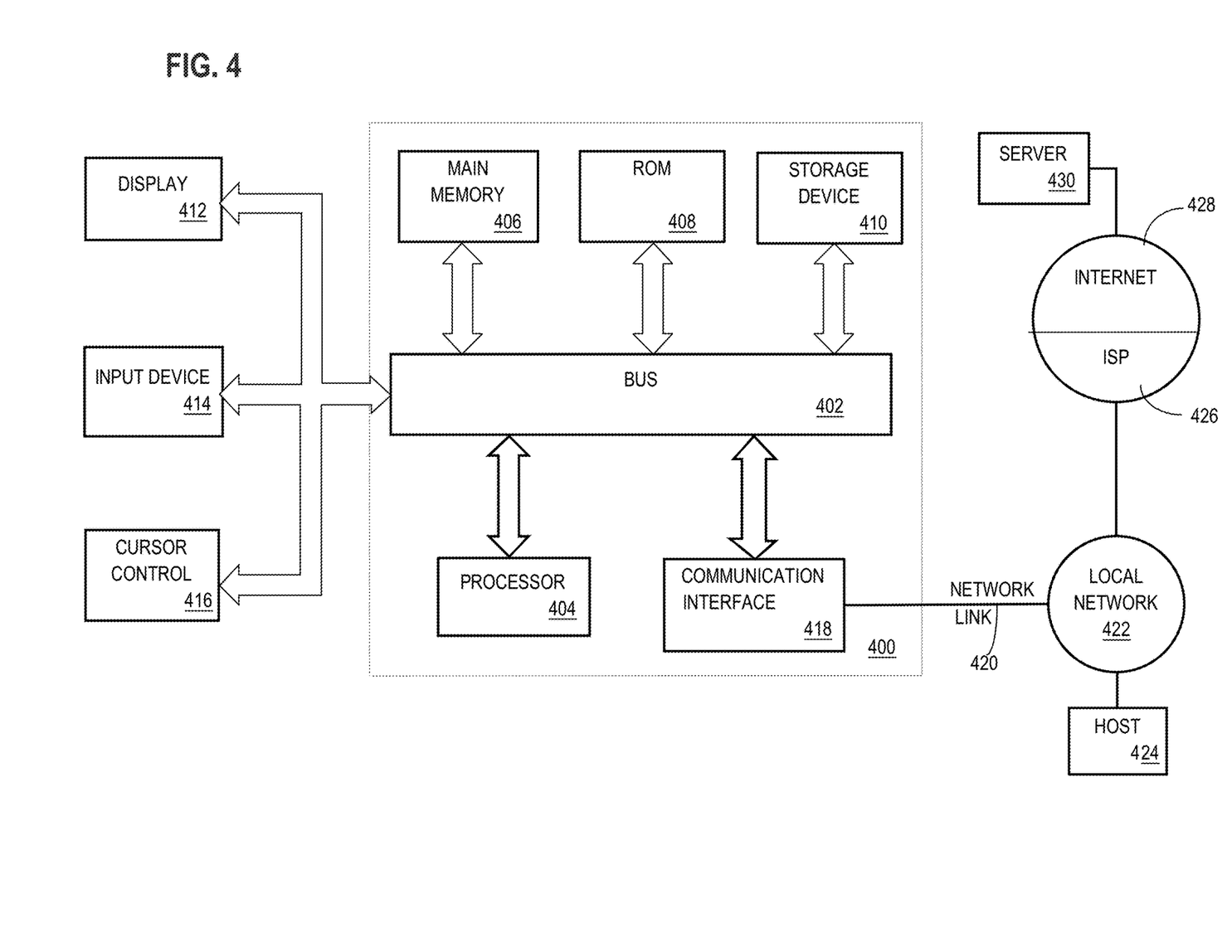
FIG. 4 is a block diagram of a computing device in which the present disclosure may be embodied.

Referring now to FIG. 4, it is a block diagram that illustrates a basic computing device 400 in which the example embodiment(s) of the present disclosure may be embodied. Computing device 400 and its components, including their connections, relationships, and functions, is meant to be illustrative, and not meant to limit implementations of the example embodiment(s). Other computing devices suitable for implementing the example embodiment(s) may have different components, including components with different connections, relationships, and functions.

Computing device 400 may include a bus 402 or other communication mechanism for addressing main memory 406 and for transferring data between and among the various components of device 400.

Computing device 400 may also include one or more hardware processors 404 coupled with bus 402 for processing information. A hardware processor 404 may be a general purpose microprocessor, a system on a chip (SoC), or other processor.

Main memory 406, such as a random access memory (RAM) or other dynamic storage device, also may be coupled to bus 402 for storing information and software instructions to be executed by processor(s) 404. Main memory 406 also may be used for storing temporary variables or other intermediate information during execution of software instructions to be executed by processor(s) 404.

Software instructions, when stored in storage media accessible to processor(s) 404, render computing device 400 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 400 also may include read only memory (ROM) 408 or other static storage device coupled to bus 402 for storing static information and software instructions for processor(s) 404.

One or more mass storage devices 410 may be coupled to bus 402 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 410 (e.g., the main hard disk for the device) stores a body of program and data for directing operation of the computing device, including an operating system, user application programs, driver and other support files, as well as other data files of all sorts.

Computing device 400 may be coupled via bus 402 to display 412, such as a liquid crystal display (LCD) or other electronic visual display, for displaying information to a computer user. In some configurations, a touch sensitive surface incorporating touch detection technology (e.g., resistive, capacitive, etc.) may be overlaid on display 412 to form a touch sensitive display for communicating touch gesture (e.g., finger or stylus) input to processor(s) 404.

An input device 414, including alphanumeric and other keys, may be coupled to bus 402 for communicating information and command selections to processor 404. In addition to or instead of alphanumeric and other keys, input device 414 may include one or more physical buttons or switches such as, for example, a power (on/off) button, a "home" button, volume control buttons, or the like.

Another type of user input device may be a cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

While in some configurations, such as the configuration depicted in FIG. 4, one or more of display 412, input device 414, and cursor control 416 are external components (i.e., peripheral devices) of computing device 400, some or all of display 412, input device 414, and cursor control 416 are integrated as part of the form factor of computing device 400 in other configurations.

Functions of the disclosed systems, methods, and modules may be performed by computing device 400 in response to processor(s) 404 executing one or more programs of software instructions contained in main memory 406. Such software instructions may be read into main memory 406 from another storage medium, such as storage device(s) 410. Execution of the software instructions contained in main memory 406 cause processor(s) 404 to perform the functions of the example embodiment(s).

While functions and operations of the example embodiment(s) may be implemented entirely with software instructions, hard-wired or programmable circuitry of computing device 400 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more software instructions to processor(s) 404 for execution. For example, the software instructions may initially be carried on a magnetic disk or solid-state drive of a remote computer. The remote computer can load the software instructions into its dynamic memory and send the software instructions over a telephone line using a modem. A modem local to computing device 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor(s) 404 retrieves and executes the software instructions. The software instructions received by main memory 406 may optionally be stored on storage device(s) 410 either before or after execution by processor(s) 404.

Computing device 400 also may include one or more communication interface(s) 418 coupled to bus 402. A communication interface 418 provides a two-way data communication coupling to a wired or wireless network link 420 that is connected to a local network 422 (e.g., Ethernet network, Wireless Local Area Network, cellular phone network, Bluetooth wireless network, or the like). Communication interface 418 sends and receives electrical, electromagnetic, or optical signals that carry digital data streams representing various types of information. For example, communication interface 418 may be a wired network interface card, a wireless network interface card with an integrated radio antenna, or a modem (e.g., ISDN, DSL, or cable modem).

Network link(s) 420 typically provide data communication through one or more networks to other data devices. For example, a network link 420 may provide a connection through a local network 422 to a host computer 424 or to data equipment operated by an Internet Service Provider (ISP) 426. ISP 426 in turn provides data communication services through the world wide packet data communication network now commonly referred to as the "Internet" 428. Local network(s) 422 and Internet 428 use electrical, electromagnetic or optical signals that carry digital data streams. The signals through the various networks and the signals on network link(s) 420 and through communication interface(s) 418, which carry the digital data to and from computing device 400, are example forms of transmission media.

Computing device 400 can send messages and receive data, including program code, through the network(s), network link(s) 420 and communication interface(s) 418. In the Internet example, a server 430 might transmit a requested code for an application program through Internet 428, ISP 426, local network(s) 422 and communication interface(s) 418.

The received code may be executed by processor 404 as it is received, and/or stored in storage device 410, or other non-volatile storage for later execution.

Software Overview

Figure 5:
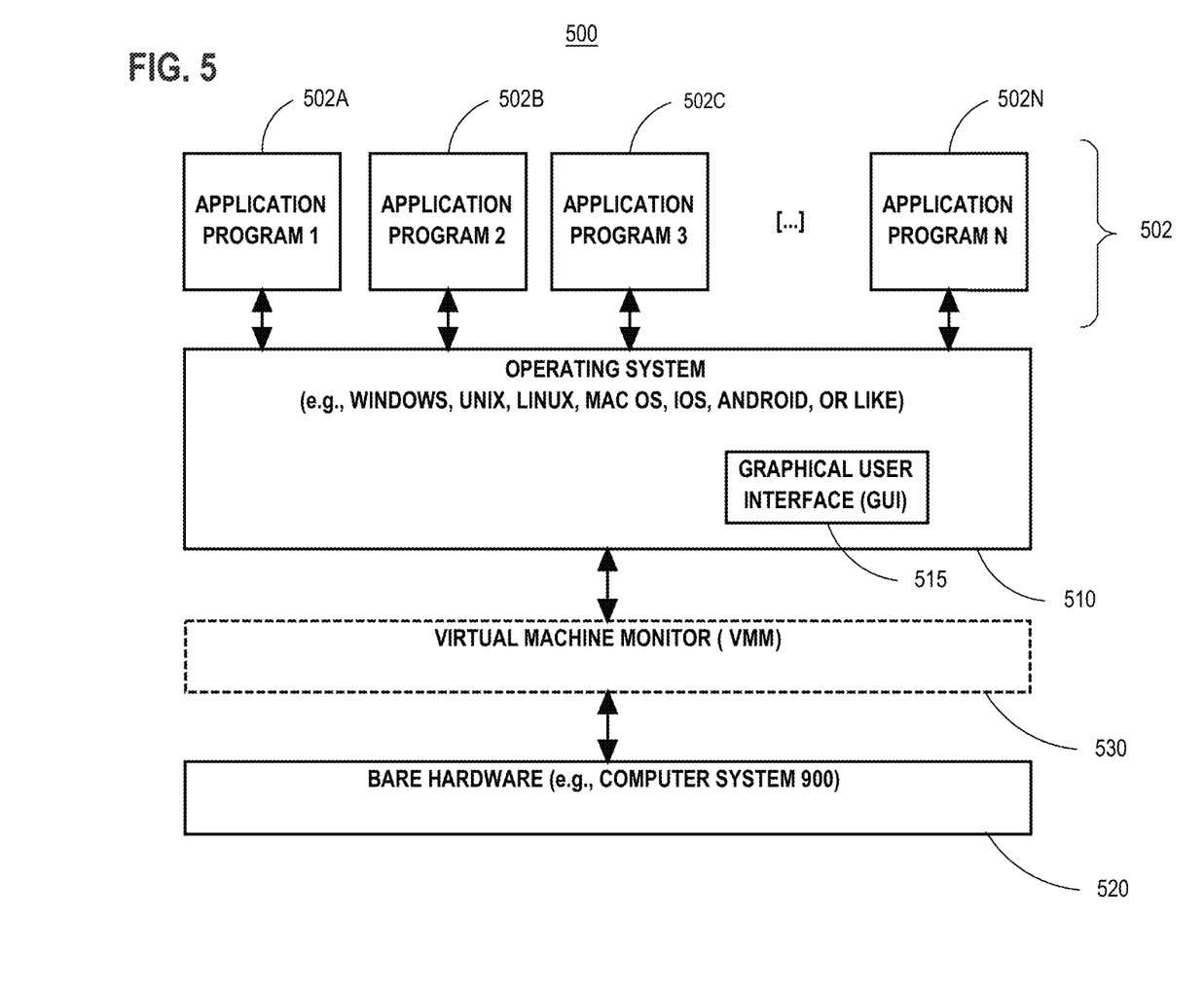
FIG. 5 is a block diagram of a basic software system for controlling the operation of the computing device.

FIG. 5 is a block diagram of a basic software system 500 that may be employed for controlling the operation of computing device 400. Software system 500 and its components, including their connections, relationships, and functions, is meant to be illustrative, and not meant to limit implementations of the example embodiment(s). Other software systems suitable for implementing the example embodiment(s) may have different components, including components with different connections, relationships, and functions.

Software system 500 is provided for directing the operation of computing device 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on device 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of device 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the device 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of device 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method comprising:
receiving, from a client application, a first database command to be executed as part of a particular transaction;
initiating, for the first database command, a local transaction that accesses a first shard of a sharded database, wherein the sharded database includes:
the first shard managed by a first database server, and
a second shard that the first database command does not access, wherein the second shard is managed by a second database server;
receiving, from the client application, a second database command to be executed as part of the particular transaction;
after said initiating the local transaction for the first database command, detecting that the second database command should access the second shard;
in response to said detecting that the second database command should access the second shard, promoting the local transaction into a distributed transaction that:
includes the first shard and the second shard, and
uses a commit protocol that the local transaction does not use; and
after said promoting the local transaction, executing the second database command in the distributed transaction.

2. The method of claim 1 wherein a database driver in the client application performs at least one selected from the group consisting of:
said detecting that the second database command should access the second shard, and
said promoting the local transaction into the distributed transaction.

3. The method of claim 1 wherein:
a first computer hosts the client application;
a second computer hosts a shard director;
said detecting that the second database command should access the second shard comprises:
sending, to the shard director, the second database command, and
receiving, from the shard director, a shard key value that corresponds to the second shard.

4. The method of claim 1 wherein said promoting the local transaction comprises promoting the local transaction into one selected from the group consisting of an extended architecture (XA) transaction and a Java transaction API (application programing interface) (JTA) transaction.

5. The method of claim 1 further comprising:
executing the first database command;
detecting that said executing the second database command failed;
rolling back, in response to said detecting that said executing the second database command failed, changes made during execution of the first database command.

6. The method of claim 1 wherein:
the sharded database includes a third shard managed by a third database server; and
the method further comprises detecting that the second database command should access the third shard.

7. The method of claim 1 wherein said detecting that the second database command should access the second shard comprises:
obtaining a shard key expression that corresponds to the second database command, and
evaluating the shard key expression to obtain a shard key value that corresponds to the second shard.

8. The method of claim 7 wherein:
a first computer hosts the client application;
said obtaining the shard key expression comprises a database driver in the client application performing:
sending the second database command to a second computer, and
receiving the shard key expression from the second computer.

9. The method of claim 8 wherein said receiving the shard key expression comprises receiving a sequence of stack operators in a particular order in the shard key expression.

10. The method of claim 9 wherein said evaluating the shard key expression comprises applying, by the database driver in the client application, the sequence of stack operators in the particular order to a stack to generate said shard key value.

11. One or more non-transitory computer-readable media storing instructions that, when executed by one or more processors, cause:
receiving, from a client application, a first database command to be executed as part of a particular transaction;
initiating, for the first database command, a local transaction that accesses a first shard of a sharded database, wherein the sharded database includes:
the first shard managed by a first database server, and
a second shard that the first database command does not access, wherein the second shard is managed by a second database server;
receiving, from the client application, a second database command to be executed as part of the particular transaction;
after said initiating the local transaction for the first database command, detecting that the second database command should access the second shard;
in response to said detecting that the second database command should access the second shard, promoting the local transaction into a distributed transaction that:
includes the first shard and the second shard, and
uses a commit protocol that the local transaction does not use; and
after said promoting the local transaction, executing the second database command in the distributed transaction.

12. The one or more non-transitory computer-readable media of claim 11 wherein a database driver in the client application performs at least one selected from the group consisting of:

said detecting that the second database command should access the second shard, and said promoting the local transaction into the distributed transaction.

13. The one or more non-transitory computer-readable media of claim 11 wherein:

a first computer hosts the client application;

a second computer hosts a shard director;

said detecting that the second database command should access the second shard comprises:

sending, to the shard director, the second database command, and receiving, from the shard director, a shard key value that corresponds to the second shard.

14. The one or more non-transitory computer-readable media of claim 11 wherein said promoting the local transaction comprises promoting the local transaction into one selected from the group consisting of an extended architecture (XA) transaction and a Java transaction API (application programing interface) (JTA) transaction.

15. The one or more non-transitory computer-readable media of claim 11 wherein the instructions further cause:

executing the first database command;

detecting that said executing the second database command failed;

rolling back, in response to said detecting that said executing the second database command failed, changes made during execution of the first database command.

16. The one or more non-transitory computer-readable media of claim 11 wherein:

the sharded database includes a third shard managed by a third database server; and the instructions further cause detecting that the second database command should access the third shard.

17. The one or more non-transitory computer-readable media of claim 11 wherein said detecting that the second database command should access the second shard comprises:

obtaining a shard key expression that corresponds to the second database command, and evaluating the shard key expression to obtain a shard key value that corresponds to the second shard.

18. The one or more non-transitory computer-readable media of claim 17 wherein:

a first computer hosts the client application;

said obtaining the shard key expression comprises a database driver in the client application performing:

sending the second database command to a second computer, and receiving the shard key expression from the second computer.

19. The one or more non-transitory computer-readable media of claim 18 wherein said receiving the shard key expression comprises receiving a sequence of stack operators in a particular order in the shard key expression.

20. The one or more non-transitory computer-readable media of claim 19 wherein said evaluating the shard key expression comprises applying, by the database driver in the client application, the sequence of stack operators in the particular order to a stack to generate said shard key value.

* * * * *

UNITED STATES PATENT AND TRADEMARK OFFICE
CERTIFICATE OF CORRECTION

PATENT NO. : 11,609,901 B2
APPLICATION NO. : 17/473525
DATED : March 21, 2023
INVENTOR(S) : Wong et al.

It is certified that error appears in the above-identified patent and that said Letters Patent is hereby corrected as shown below:

In the Specification

In Column 9, Line 9, delete "51" and insert -- S1 --, therefor.

In Column 9, Line 11, delete "51" and insert -- S1 --, therefor.

In Column 9, Line 17, delete "51" and insert -- S1 --, therefor.

In Column 9, Line 19, delete "51" and insert -- S1 --, therefor.

In Column 9, Line 25, delete "51" and insert -- S1 --, therefor.

Signed and Sealed this
Second Day of January, 2024

Katherine Kelly Vidal
*Director of the United States Patent and Trademark Office*